United States Patent
Hagan et al.

(10) Patent No.: US 8,570,012 B2
(45) Date of Patent: Oct. 29, 2013

(54) DIODE FOR USE IN A SWITCHED MODE POWER SUPPLY

(75) Inventors: Tobin D. Hagan, Plano, TX (US); Marco Corsi, Parker, TX (US); David L. Freeman, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 11 days.

(21) Appl. No.: 13/324,709

(22) Filed: Dec. 13, 2011

(65) Prior Publication Data

US 2013/0146887 A1    Jun. 13, 2013

(51) Int. Cl.
*G05F 1/10* (2006.01)
*H03K 19/20* (2006.01)
*H03K 19/094* (2006.01)

(52) U.S. Cl.
USPC .......................................... 323/282; 326/120

(58) Field of Classification Search
None
See application file for complete search history.

(56) References Cited

U.S. PATENT DOCUMENTS

| | | | |
|---|---|---|---|
| 2010/0259186 A1* | 10/2010 | Ernoux | 315/294 |
| 2012/0074920 A1* | 3/2012 | Callanan | 323/311 |
| 2012/0241756 A1* | 9/2012 | Zhang et al. | 257/76 |
| 2012/0241820 A1* | 9/2012 | Briere et al. | 257/195 |
| 2012/0280247 A1* | 11/2012 | Cheah et al. | 257/76 |

OTHER PUBLICATIONS

"Digital Loss-Minimizing Multi-Mode Synchronous Buck Converter Control," 2004 35th Annul IEEE Power Elecrronics Specialisrs Conference, Aachen, Germany, 2004, pp. 3694-3699 (Petrechev, et al.).

* cited by examiner

*Primary Examiner* — Jany Richardson
(74) *Attorney, Agent, or Firm* — John R. Pessetto; W. James Brady; Frederick J. Telecky, Jr.

(57) ABSTRACT

A tunable depletion diode is provided. Within this depletion diode, there is a depletion mode transistor that is coupled to the anode terminal at its gate and the cathode terminal at its drain. A diode is coupled between the source of the depletion mode transistor and the anode terminal, and a variable capacitor is coupled between the source of the depletion mode transistor and the anode terminal, where the capacitance of the variable capacitor is controls the reverse recovery time of the tunable depletion diode.

8 Claims, 5 Drawing Sheets

DIODE FOR USE IN A SWITCHED MODE POWER SUPPLY

TECHNICAL FIELD

The invention relates generally to a diode and, more particularly, to a diode for use in a switched mode power supplies (SMPS).

BACKGROUND

SMPSs are employed in a variety of applications, operating as buck and/or boost converters. These applications usually have low input voltages (i.e., <5V) and can operate at frequencies ranging from a few kilohertz to tens of megahertz. With applications having high input voltages (i.e., >30V) and high frequencies (i.e., >1 MHz), switching losses due to the output capacitance seen at the switching node can be large. Thus, there is a need for an SMPS that efficiently operates with high input voltages and at high frequencies. An example of a conventional circuit is: Petrechev et al., "Digital Loss-Minimizing Multi-Mode Synchronous Buck Converter Control," 2004 35$^{th}$ Annual IEEE Electronics Specialists Conf., Aachen, Germany 2004, pp. 3694-3699.

SUMMARY

An embodiment of the present invention, accordingly, provides an apparatus. The apparatus comprises a switching circuit that includes a switching node having a switch node voltage and that receives an input voltage; an inductor that is coupled to the switching node; a capacitor that is coupled to the inductor; and a controller that is coupled to the switching circuit and that operates at a switching frequency with a conversion efficiency, wherein the controller controls slewing of the switching node voltage using a negative inductor current from the inductor, and wherein, for the conversion efficiency, the switching frequency and the input voltage are sufficiently large so as to overcome a loss incurred by using the negative inductor current.

In accordance with an embodiment of the present invention, the switching circuit further comprises high-side transistor that receives the input voltage at is drain, that is coupled to the switching node at its source, and that is coupled to the controller at its gate.

In accordance with an embodiment of the present invention, the switching circuit further comprises a low-side transistor that is coupled to the switching node at its drain and that is coupled to the controller at its gate.

In accordance with an embodiment of the present invention, the conversion efficiency is about 70% or greater, and wherein the input voltage is greater than 120V, and wherein the switching frequency is greater than 1 MHz.

In accordance with an embodiment of the present invention, the switching circuit further comprises a diode that is coupled between the switching node and ground.

In accordance with an embodiment of the present invention, the switching circuit further comprises a depletion mode diode having: a depletion mode transistor that is coupled to the switching node at its drain and ground at its gate; a diode that is coupled between the source of the depletion mode transistor and ground; and a variable capacitor that is coupled between the source of the depletion mode transistor and ground.

In accordance with an embodiment of the present invention, the variable capacitor further comprises a switched capacitor array.

In accordance with an embodiment of the present invention, the depletion mode transistor is a gallium nitride transistor.

In accordance with an embodiment of the present invention, the switching circuit further comprises low-side transistor that is coupled to ground at is source, that is coupled to the switching node at its drain, and that is coupled to the controller at its gate.

In accordance with an embodiment of the present invention, the switching circuit further comprises a diode that is coupled to the switching node and that receives the input voltage.

In accordance with an embodiment of the present invention, the switching circuit further comprises a depletion mode diode having: a depletion mode transistor that is coupled to the switching node at its gate and that receives the input voltage at its drain; a diode that is coupled between the source of the depletion mode transistor and the switching node; and a variable capacitor that is coupled between the source of the depletion mode transistor and the switching node.

In accordance with an embodiment of the present invention, a method for generating an output voltage from an input voltage with a switched mode power supply at a switching frequency is provided. The method comprises at the switching frequency, deactivating a transistor within a switching circuit so as to enter into a dead time interval, wherein the switching circuit includes a switching node; and using a negative inductor current during the dead time interval so as to slew the switching node, wherein switching frequency and the input voltage are sufficiently large so as to overcome a loss incurred by using the negative inductor current.

In accordance with an embodiment of the present invention, the step of deactivating further comprises deactivating a low-side transistor that is coupled to the switching node.

In accordance with an embodiment of the present invention, the method further comprises activating a high-side transistor when the voltage on the switching node reaches the input voltage.

In accordance with an embodiment of the present invention, an apparatus is provided. The apparatus comprises a switching circuit that includes a switching node having a switch node voltage and that receives an input voltage; an inductor that is coupled to the switching node; a capacitor that is coupled to the inductor; and a controller having: a gate driver circuit that is coupled to the switching circuit and that operates at a switching frequency with a conversion efficiency; a feedback circuit that is coupled to the inductor and the gate driver circuit; and a measurement circuit that is coupled to the switching node, wherein the controller controls slewing of the switching node voltage using a negative inductor current from the inductor, and wherein, for the conversion efficiency, the switching frequency and the input voltage are sufficiently large so as to overcome a loss incurred by using the negative inductor current.

In accordance with an embodiment of the present invention, the switching circuit further comprises: a high-side transistor that receives the input voltage at is drain, that is coupled to the switching node at its source, and that is coupled to the controller at its gate; and a low-side transistor that is coupled to the switching node at its drain and that is coupled to the controller at its gate; and wherein the measurement circuit further comprises: a first comparator that is coupled to the switching node and that receives the input voltage; and a second comparator that is coupled to the switching node and ground.

In accordance with an embodiment of the present invention, the measurement circuit further comprises a comparator that is coupled to the switching node and that receives the input voltage, and wherein the switching circuit further comprises: a high-side transistor that receives the input voltage at is drain, that is coupled to the switching node at its source, and that is coupled to the controller at its gate; and a diode between the switching node and ground.

In accordance with an embodiment of the present invention, the measurement circuit further comprises a second comparator that is coupled to the switching node and ground wherein the switching circuit further comprises: a diode that receives the input voltage at is drain and that is coupled to the switching node; and a low-side transistor that is coupled to the switching node at its drain and that is coupled to the controller at its gate.

In accordance with an embodiment of the present invention, an apparatus is provided. The apparatus comprising: a first terminal; a second terminal; a depletion mode transistor that is coupled to the second terminal at its gate and the first terminal at its drain; a diode that is coupled between the source of the depletion mode transistor and the second terminal; and a variable capacitor that is coupled between the source of the depletion mode transistor and the second terminal.

In accordance with an embodiment of the present invention, the depletion mode transistor is an n-channel gallium nitride transistor.

In accordance with an embodiment of the present invention, the variable capacitor further comprises a varactor.

In accordance with an embodiment of the present invention, tunable depletion diode is provided. The diode comprises a cathode terminal; an anode terminal; a depletion mode transistor that is coupled to the anode terminal at its gate and the cathode terminal at its drain; a diode that is coupled between the source of the depletion mode transistor and the anode terminal; and a variable capacitor that is coupled between the source of the depletion mode transistor and the anode terminal, wherein the capacitance of the variable capacitor is controls the reverse recovery time of the tunable depletion diode.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
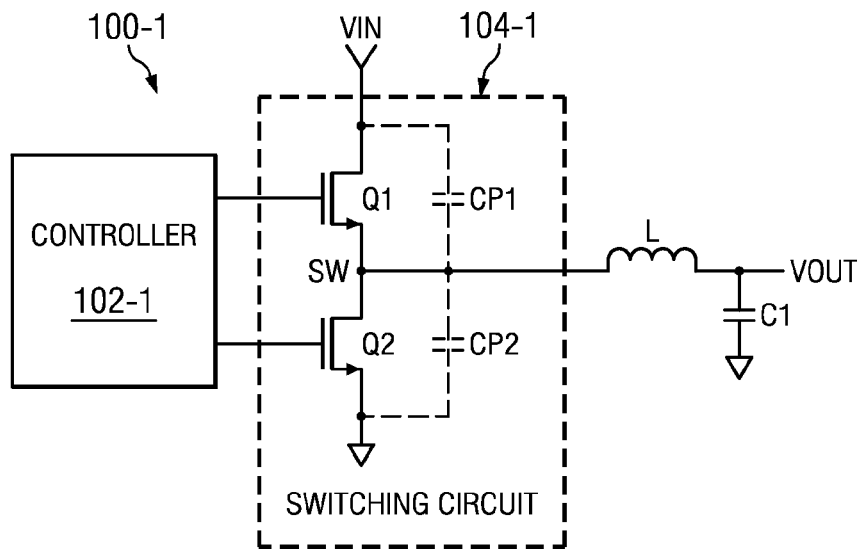
FIG. 1 is a diagram of an example of an SMPS in accordance with the present invention.
Figure 2:
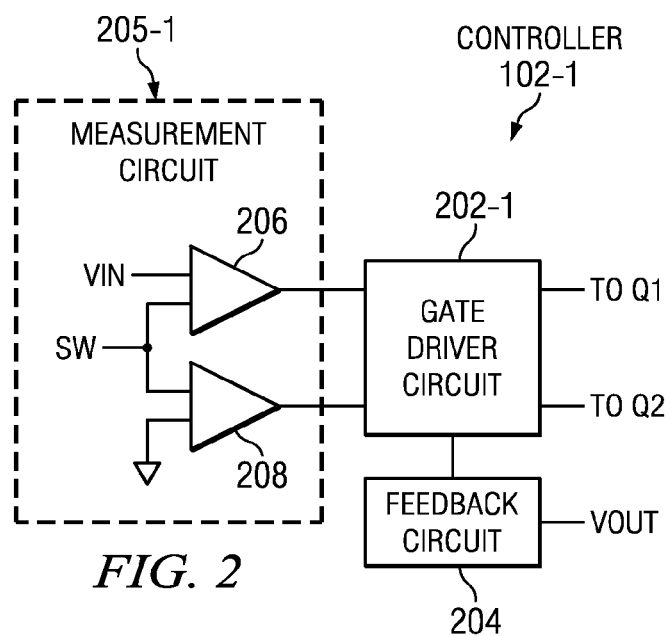
FIG. 2 is a diagram of an example of the controller of FIG. 1.

Refer now to the drawings wherein depicted elements are, for the sake of clarity, not necessarily shown to scale and wherein like or similar elements are designated by the same reference numeral through the several views.

Figure 3:
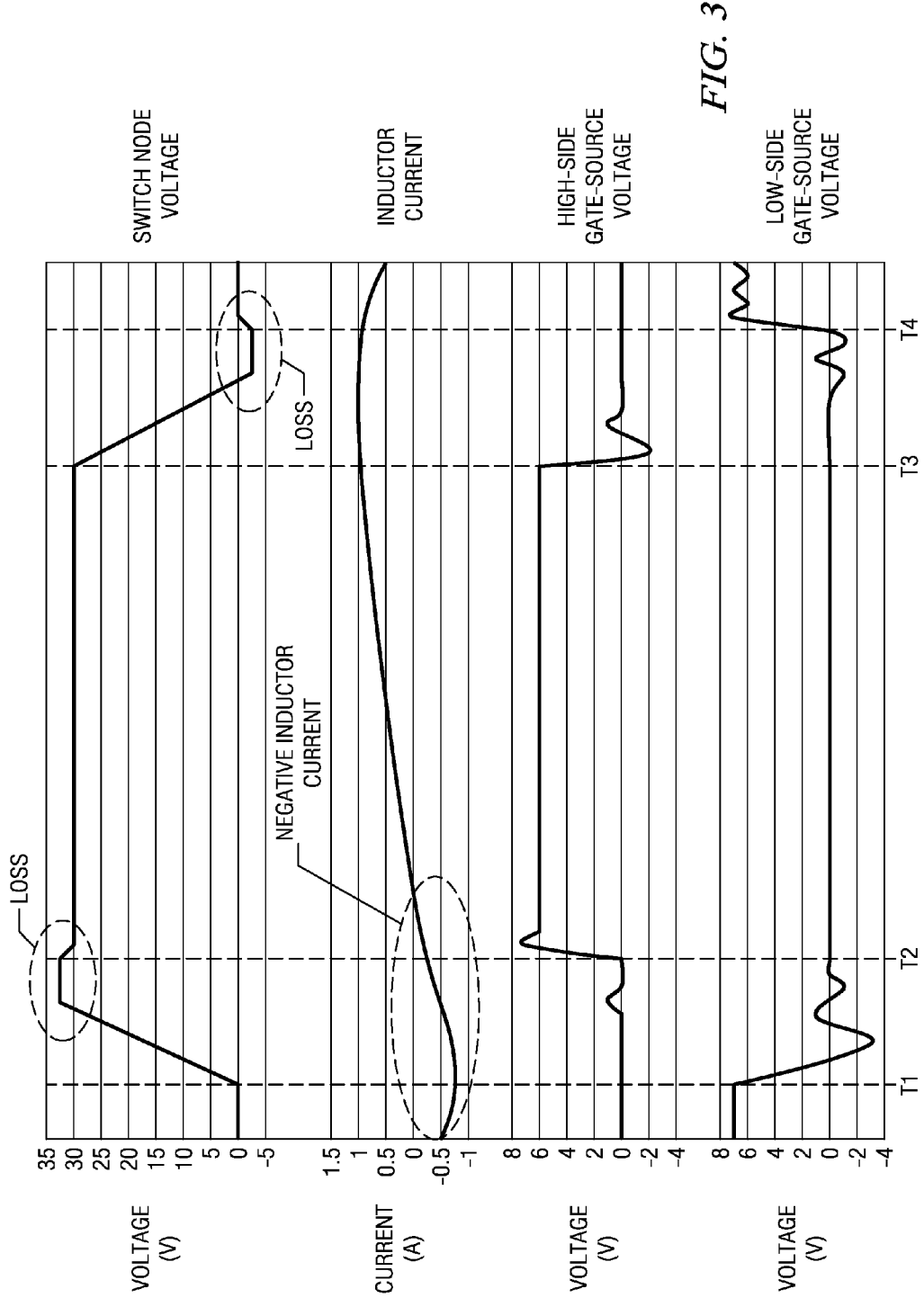
FIG. 3 is a diagram of depicting the operation of SMPS of FIG. 1.

Turning to FIGS. 1-4, an example of an SMPS 100-1 in accordance with the present invention can be seen. In this example, a controller 102-1 is used to control transistors Q1 and Q2 of switching circuit 104-1 (which also has parasitic capacitances CP1 and CP2). The switching circuit 104-1 is then able to generate output voltage VOUT (i.e., 2V) from an input voltage VIN (i.e., 300V) using inductor L and capacitor C1. Preferably, the controller 102-1 is able to modulate or control the dead time intervals (i.e., interval between times T1 and T2 and interval between times T3 and T4) where both the transistors Q1 and Q2 are deactivated or "off" to slew the switching node SW up and down with the inductor current. This type of switching is often referred to as "soft-switching." As shown in the example of FIG. 3, the controller deactivates transistor Q2 at time T1 (while transistor Q1 remains "off"), and, during this dead time interval between times T1 and T2, the inductor current (from inductor L) is negative (where current flows into the switch node SW), causing the voltage on the switching node to slew up or increase. Once the voltage on the switching node SW reaches the input voltage VIN (which in this example is about 30V), the comparator 206 of measurement circuit 205-1 indicates this, allowing the gate driver circuit 202-1 to activate transistor Q1. Subsequently, for the dead time interval between times T3 and T4, comparator 208 of measurement circuit 205-1 can be used to measure when the voltage on the switching node SW has reached zero, allowing the gate driver circuit 202-1 to activate transistor Q2. Additionally, feedback circuit 204 (which can, for example, include a voltage divider and error amplifier) can provide correction signals to the gate driver circuit 202-1, which vary the "on" and "off" times of the transistors Q1 and Q2 to maintain a desired output voltage VOUT and/or output current.

Figure 4:
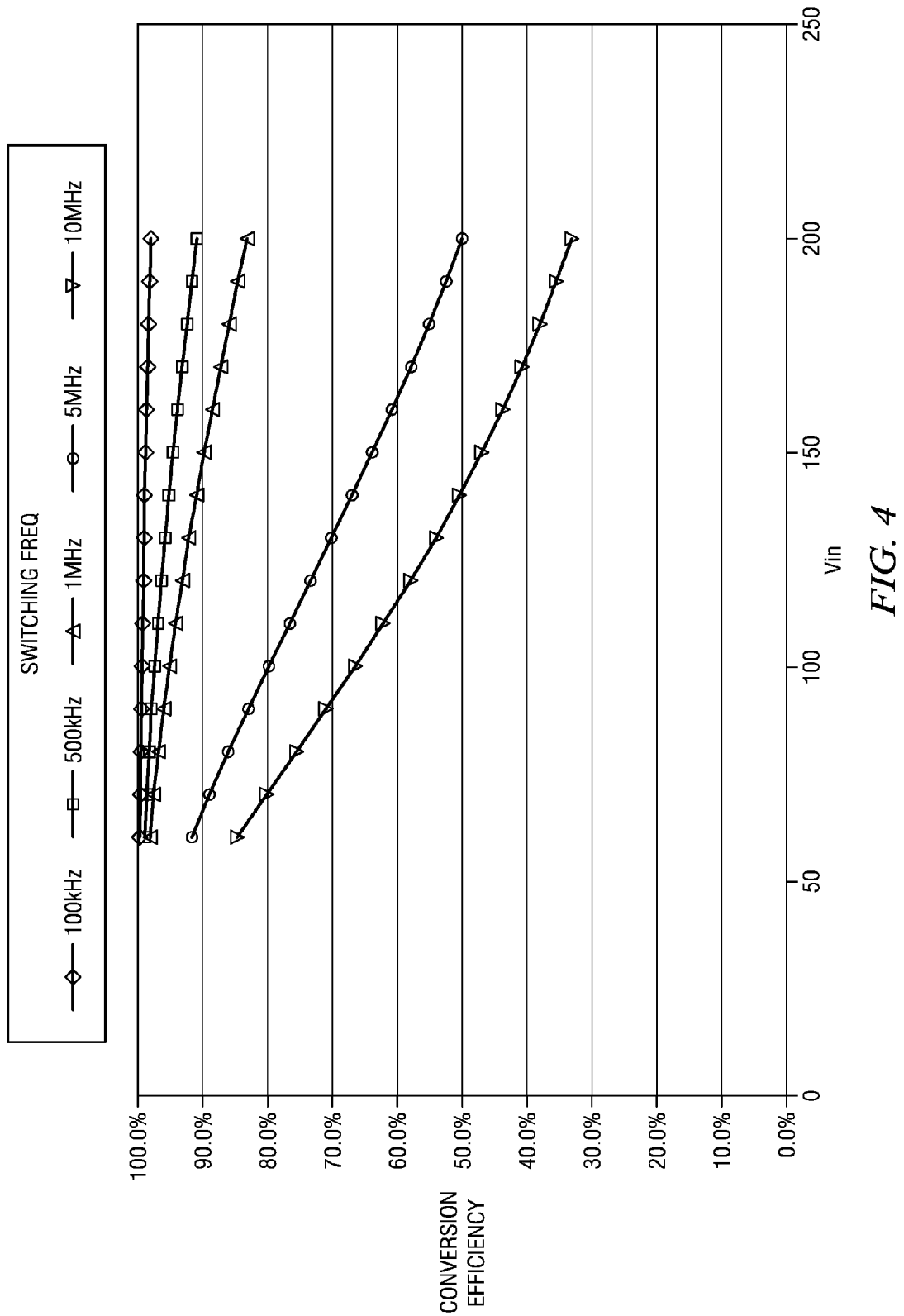
FIG. 4 is a diagram depicting the input voltage versus conversion efficiency for SMPSs operating at various frequencies.
Figure 5:
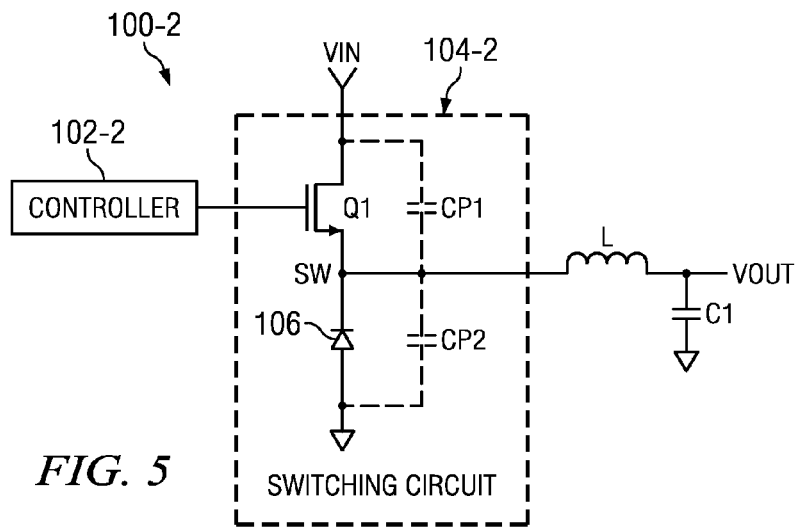
FIG. 5 is a diagram of an example of an SMPS in accordance with the present invention.
Figure 6:
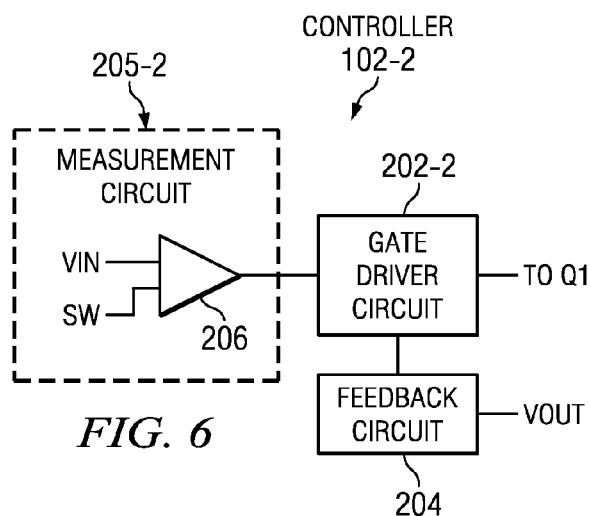
FIG. 6 is a diagram of an example of the controller of FIG. 5.
Figure 7:
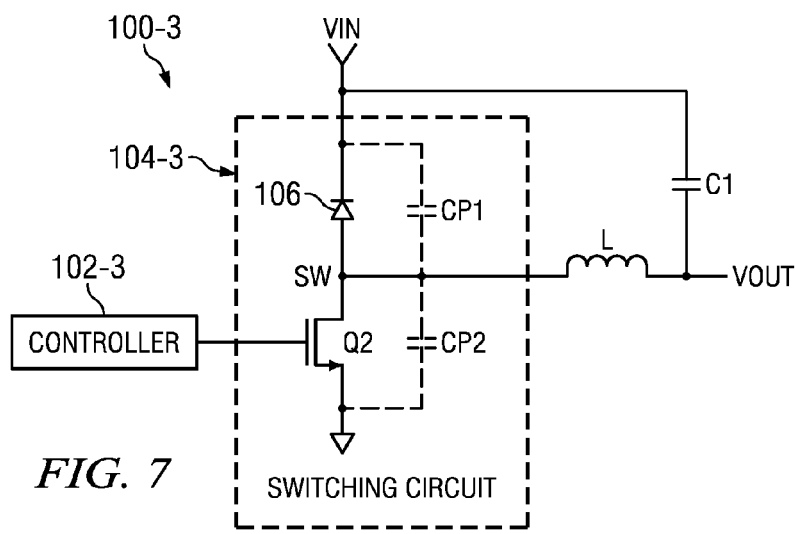
FIG. 7 is a diagram of an example of an SMPS in accordance with the present invention.
Figure 8:
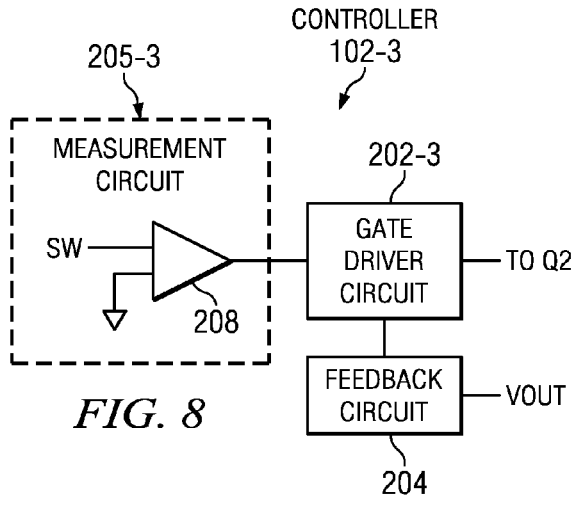
FIG. 8 is a diagram of an example of the controller of FIG. 7.

It should also be noted that as the voltage on the switching node SW reaches the input voltage VIN (which is 30V for this example) or reaches zero toward the end of the dead time intervals (i.e., between times T1 and T2 and between times T3 and T4), the voltage on switching node SW peaks above the input voltage VIN or below ground or zero by as much as several volts, causing dead time losses. Typically, for CMOS transistors, the voltage peak or excursion is about 0.7V to about 1.0V, and, with "hard switching," it is desirable to activate switch Q1 or Q2 upon reaching its switching point (i.e., 0V or VIN), which is, effectively, an attempt to minimize the dead time. These dead time losses are caused by the body diodes of Q1 and Q2 (and, namely, negative inductor currents), and, for low input voltages VIN, these dead time losses can be substantial. For example, if the input voltage VIN is 5V, the soft-switching efficiency loss can be on the order of a 1V (causing an appreciable efficiency loss). However, when the input voltage VIN is sufficiently high (i.e., 30V), this loss is negligible. Moreover, the switching losses due to the output capacitance seen at the switching node SW are frequency dependent, so at high input voltages VIN and high switching frequencies, the losses are substantial. Thus, for the use of soft-switching or for allowing the use of a negative current, the input voltage VIN and switching frequency should be sufficiently large as to overcome or make negligible these dead time losses and switching losses due to the output capacitance seen at the switching node SW. As shown in the graph of FIG. 4, the conversion efficiency remains relatively high (i.e., >80%) for high input voltage (i.e., up to about 200V) for conventional SMPSs operating at low frequencies (i.e., <1 MHz), meaning that the switching losses that SMPS 100-1 addresses are not dominant. However, at high input voltage VIN (i.e., >30V) and high switching frequencies (i.e., >1 MHz), the switching loss become dominant, and the input voltage VIN is sufficiently large so as to make the dead time losses negligible. As an example, the SMPS 100-1 can be employed to achieve a conversion efficiency of about 70% (or greater), where the input voltage VIN is greater than 120V and the switching frequency is greater than 1 MHz.

Alternatively, transistors Q1 or Q2 can be replaced with a diode 106 to achieve substantially the same result, as shown with the SPMSs 100-2 and 100-3 of FIGS. 5-8. When the diode 106 replaces transistor Q2 in SMPS 100-2, the SMPS 100-2 relies on the reverse recovery time of diode 106 (i.e., period where diode is reverse-bias conducting) that allows for a negative inductor current to slew the switching node SW, but the diode 106 should be selected to have an appropriate reverse recovery time to achieve this result. With SMPS 100-2, the controller 102-2 can use comparator 206 within measurement circuit 205-2, as gate driver circuit 202-2 does not provide a gate drive or control signal to a "low-side transistor." When the diode 106 replaces transistor Q1 in SMPS 100-3, the SMPS 100-3 is configured to operate as an "inverted buck converter" and, similarly, using the reverse recovery time of diode 106, achieves the desired result. Additionally, the controller 102-3 can use comparator 208 within measurement circuit 205-3, as gate driver circuit 202-3 does not provide a gate drive or control signal to a "high-side transistor."

Figure 9:
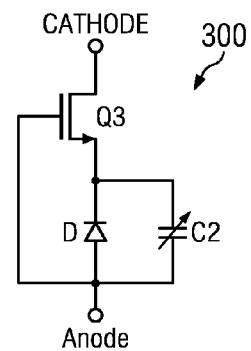
FIG. 9 is a diagram of a depletion diode that can be used in the SMPS of FIGS. 4 and 6.

The use of a diode (i.e., diode 106) may be preferable because the configuration of the controller (i.e., 102-2 or 102-3) would be simpler, but conventional diodes may be prohibitive, as it may limit the functionality of the SMPS 100-2 or 100-3 or may not be manufacturable. Thus, a depletion diode 300, as shown in FIG. 9, may be used because this depletion diode 300 has a tunable reverse recover time. The depletion diode 300 is generally comprised of a depletion mode transistor Q3 (which can, for example, be a depletion mode n-channel gallium nitride or GaN transistor), a diode D, and a variable tuning capacitor C2 (which can, for example, be a switch capacitor array or a varactor).

Figure 10:
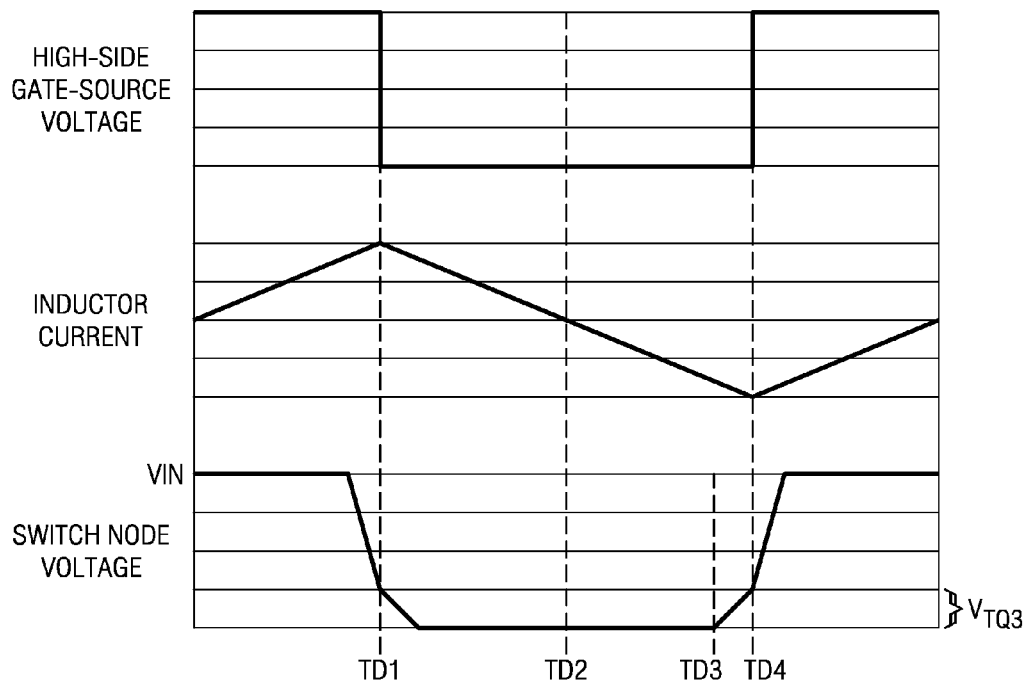
FIG. 10 is a diagram depicting the operation of the depletion diode of FIG. 9.

Assuming, for example, that diode 300 is employed as diode 106 in SMPS 100-2, the benefits of employing diode 300 can be seen in FIG. 10. Because the transistor Q3 is a depletion mode transistor, it is generally "off" when transistor Q1 is generally "on," isolating the diode D and capacitor C3, and it is "on" when transistor Q1 is "off" (i.e., between times TD1 and TD4). At time TD2 (when the transistor Q3 is "on" or active), the inductor current becomes negative, and, at time TD3, diode D begins blocking (meaning that the interval between TD2 and TD3 is the reverse recover time for diode D). At time TD3, current begins flowing to capacitor C3, causing the voltage on the switching node SW to increase. The rate of change of the voltage on the switching node SW is a function of the capacitance of capacitor C3 and the negative inductor current, so, when the voltage on the switching node SW reaches the threshold voltage $V_{TQ3}$ of transistor Q3 (which can, for example, be 10V), the transistor Q3 is deactivated. Thus, depletion diode 300 has an variable reverse recovery time that can be adjusted by varying the capacitance of capacitor C3.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   a first terminal;
   a second terminal;
   a depletion mode transistor that is coupled to the second terminal at its gate and the first terminal at its drain;
   a diode that is coupled between the source of the depletion mode transistor and the second terminal; and
   a variable capacitor that is coupled between the source of the depletion mode transistor and the second terminal.

2. The apparatus of claim 1, wherein the depletion mode transistor is an n-channel gallium nitride transistor.

3. The apparatus of claim 2, wherein the variable capacitor further comprises a switched capacitor array.

4. The apparatus of claim 3, wherein the variable capacitor further comprises a varactor.

5. A tunable depletion diode comprising:
   a cathode terminal;
   an anode terminal;
   a depletion mode transistor that is coupled to the anode at its gate and the cathode terminal at its drain;
   a diode that is coupled between the source of the depletion mode transistor and the anode terminal; and
   a variable capacitor that is coupled between the source of the depletion mode transistor and the anode terminal, wherein the capacitance of the variable capacitor is controls the reverse recovery time of the tunable depletion diode.

6. The apparatus of claim 5, wherein the depletion mode transistor is an n-channel gallium nitride transistor.

7. The apparatus of claim 6, wherein the variable capacitor further comprises a switched capacitor array.

8. The apparatus of claim 6, wherein the variable capacitor further comprises a varactor.

* * * * *